(12) United States Patent
Sapir

(10) Patent No.: US 6,667,691 B2
(45) Date of Patent: Dec. 23, 2003

(54) APPARATUS FOR THE DETECTION AND EARLY WARNING OF ELECTRICAL ARCING FAULT

(76) Inventor: Michael Sapir, 12 Hatzav Street, 84847 Beer Sheva (IL)

(*) Notice: Subject to any disclaimer, the term of this patent is extended or adjusted under 35 U.S.C. 154(b) by 0 days.

(21) Appl. No.: 10/225,801

(22) Filed: Aug. 22, 2002

(65) Prior Publication Data

US 2003/0030448 A1 Feb. 13, 2003

Related U.S. Application Data

(63) Continuation of application No. PCT/IL01/00252, filed on Mar. 15, 2001.

(30) Foreign Application Priority Data

Mar. 16, 2000 (IL) ................................................. 135120

(51) Int. Cl.$^7$ .............................................. G08B 21/00
(52) U.S. Cl. ................. 340/635; 340/636.13; 340/638; 340/652; 340/653; 361/42; 324/522; 324/536
(58) Field of Search ........................... 340/635, 636.13, 340/638, 652, 653, 657, 664; 361/42, 94, 92, 87, 44, 45, 83; 324/520, 536, 535, 521, 522, 512

(56) References Cited

U.S. PATENT DOCUMENTS

| | | | |
|---|---|---|---|
| 3,619,723 A | * 11/1971 | Walden ........................ 361/45 |
| 4,466,071 A | 8/1984 | Russell, Jr. | |
| 5,475,371 A | * 12/1995 | Dunk et al. ................. 340/660 |
| 5,682,101 A | 10/1997 | Brooks et al. | |
| 5,726,577 A | 3/1998 | Engel et al. | |
| 5,729,145 A | 3/1998 | Blades | |
| 5,815,352 A | * 9/1998 | Mackenzie ................... 361/42 |
| 5,818,237 A | 10/1998 | Zuercher et al. | |
| 5,835,321 A | 11/1998 | Elms et al. | |
| 6,198,611 B1 | * 3/2001 | Macbeth ....................... 361/42 |
| 6,388,849 B1 | * 5/2002 | Rae ............................. 361/42 |
| 6,577,484 B1 | * 6/2003 | Macbeth et al. .............. 361/92 |

* cited by examiner

*Primary Examiner*—Nina Tong
(74) *Attorney, Agent, or Firm*—Frommer Lawrence & Haug, LLP; William S. Frommer (57) ABSTRACT

A method for the early detection of faults in an electric supply system, comprising the steps of continuously checking the existence of RF transients on the electric supply system line, transforming detected transients whose amplitude is above a predetermined level, into a sequence of pulses, analyzing the temporal spacing between pulses to identify those which are due to dimmers, and disregarding them, identifying short-noisy states structures in said sequence, states whose duration is shorter than a period T-ARC, determining short-noisy states where the current amplitudes before and after said states are different, and disregarding these states considered to be caused by normal switching operations, regarding each of the remaining short-noisy states as a faulty event and accumulating such events in a first register, identifying separately long-noisy states in said sequence, states whose duration is longer than a period T-ARC, ascribing a number of arcing events to each long-noisy state proportional to its duration, and accumulating these numbers in a second register; and summing the values in said first and second registers, and if the sum exceeds a predetermined value N-ALARM, within a predetermined period, activating an alarm and/or a current breaker.

14 Claims, 8 Drawing Sheets

| ITEM | QTY | DESCRIPTION | REF |
|---|---|---|---|
| | | RESISTORS | |
| 1 | 3 | 1k  5%  0.125w | R1,R10,R11 |
| 2 | 1 | 10k  5%  0.125w | R2 |
| 3 | 1 | 39k  5%  0.125w | R3 |
| 4 | 5 | 4.7k  5%  0.125w | R4,R5,R7, R11,R13 |
| 5 | 1 | 10M  5%  0.125w | R6 |
| 6 | 1 | 4.7M  5%  0.125w | R9 |
| | | | |
| | | POTENTIOMETER | |
| 7 | 1 | 25kTrimming Potentiometer | R8 |
| | | | |
| | | Ceramic Capacitors | |
| 8 | 1 | 1nF  20%  100v | C1 |
| 9 | 1 | 5pF  20%  25v | C2 |
| 10 | 2 | 22pF  20%  25v | C4,C5 |
| 11 | 1 | 1uF  20%  25v | C6 |
| | | | |
| | | Tantalum Capacitor | |
| 12 | 1 | 10uF  6.3v | C3 |
| | | | |
| | | IC | |
| 13 | 1 | LM311 | U1 |
| 14 | 1 | LM7805 | U2 |
| 15 | 1 | PIC16c711 | U3 |
| | | | |
| | | DIODES | |
| 16 | 2 | 1N4148 | D1, D2 |
| 17 | 1 | LED GREEN | D3 |
| 18 | 1 | LED RED | D4 |

Fig. 6

| ITEM | QTY | DESCRIPTION | REF |
|---|---|---|---|
|  |  | TRANSISTOR |  |
| 19 | 1 | 2N2222 | Q1 |
|  |  |  |  |
|  |  | SWITCHES |  |
| 20 | 1 | Toggle switch 100v 0.5A | S1 |
| 21 | 2 | Pushbutton switch 50v 0.1A | S2 |
|  |  |  |  |
|  |  | Resonator |  |
| 22 | 1 | 4MHz | Y1 |
|  |  |  |  |
|  |  | Battery |  |
| 23 | 1 | 9v battery | BT1 |
|  |  |  |  |
|  |  | Buzzer |  |
| 24 | 1 | Buzzer piezoceramic 3..5KHz | BZ1 |
|  |  |  |  |
|  |  | Inductor |  |
| 25 | 1 | 100uH toroidal choker | L1 |
|  |  |  |  |

Fig. 6 (cont.)

APPARATUS FOR THE DETECTION AND EARLY WARNING OF ELECTRICAL ARCING FAULT

This is a continuation of international application PCT/IL01/00252 having an international filing date of Mar. 15, 2001.

FIELD OF THE INVENTION

The present invention relates to means for providing safety and reliability to electric circuits. More particularly, the invention relates to a method and apparatus for providing an early detection and alert of an arcing fault in electrical systems that are used in residences, commercial areas, industries, automotive vehicles, etc.

BACKGROUND OF THE INVENTION

Automatic and continuous protection of electric supply systems is accomplished today, by: a) fuses and circuit breakers that protect against dangerous over-currents by terminating the current flow in the event of a short-circuit or an overload; and b) ground fault interrupters which terminate the current flow whenever there is a dangerous leakage of current from the "line" Chase) conductor to the "ground" conductor.

Another kind of electrical fault is the arcing fault which appears when two conductors in the circuit become separated by a small air gap that allows current to pass through it. In most instances of arcing fault, the current flows intermittently, as if there is a switch that is turned alternately and irregularly "on" and "off".

Arcing fault poses the following threats and problems:
1) A fire hazard resulting from excessive heat that is liberated unexpectedly at an insufficiently protected arcing zone.
2) An arcing fault which develops into a major fault, damaging the electric appliance or machine in which it occurs and leading to a final short circuit and current termination.
3) An arcing fault which leads to bursts of over currents and to irregular current supply, which accelerates the wear of the electric appliances involved.

A series arcing fault is not protected by the above-mentioned protective means, since the current is limited by the load resistance, and is consequently below the threshold value predefined as dangerous. A parallel arcing fault is also not completely protected, since as long as the average current is below the predefined threshold value, it continues to constitute a fire hazard. Also, there is the potential for a short-circuit build-up, followed by current termination.

The need for an early warning device against the build-up of arcing conditions is clear, as such a device may be helpful in preventing fires, uncontrolled current termination, and damage to electrical appliances and machines.

In the last two decades, many devices have been introduced for the detection of arcing fault.

Most of them use the fact that discontinuities in the conduction parameters of an electric circuit lead to fast transients, and sense the resulting fast current oscillations. These high-frequency oscillations are then analyzed, by utilizing various features that differentiate between an arcing fault event and an event caused by a valid use of a load of the electric network. To facilitate the analysis, the transients are commonly converted to digital data or to other simple signals. All these suggestions differ principally, by the method of discrimination between the various events; their capabilities and efficiencies are derived accordingly.

For example, U.S. Pat. No. 4,466,071 (Russell et al.), issued in August 1984, is directed to a method and system for detecting high impedance arcing faults. The detection "is realized by monitoring the high frequency components of the alternating current and evaluating the high frequency components of each cycle". The occurrence of a significant increase in the magnitude of the high frequency components signifies either an arcing fault or a normal switching operation. The duration of time over which this increase exists, discriminates between the various possibilities and can determine the presence of an arcing fault.

The method of U.S. Pat. No. 4,466,071 poses three particular drawbacks.
1. The switching of a dimmer might be erroneously identified by this system as an arcing fault event, as such can generate a high level of high frequency current components for a sufficient time.
2. If the minimal period for determining an arcing fault is too short, for example, less than 0.5 second, then a long switching event like pressing or releasing the trigger of an electric drill might be identified as a fault; and
3. If, on the other hand, the minimal period that defines an arcing fault is too long, for example, more than 0.5 second, then short signals which characterize the early stages of the evolution towards a fault might be ignored. Thus, the opportunity for providing an early warning would be lost.

U.S. Pat. No. 5,682,101 (Brooks et al.) issued in October 1997, discloses a detector that monitors the rate-of-change of the current in the line and produces a signal which is proportional to it. The detector produces a pulse whenever the rate-of-change signal exceeds a certain threshold. Each high-frequency disturbance in the current produces steep oscillations which are filtered into a selected high-frequency band, and are transformed by the detector to pulses. The pulses are "counted" by charging a capacitor by an amount that is proportional to the number of the pulses. Upon exceeding a selected charge level, the detector signifies an arcing fault. The time constant for the discharge of the capacitor, in the example given therein, is 33 msec.

About the discrimination between various similar phenomena, Brooks states as follows: "The pattern in the rate-of-change signal produced by the sensor 21 indicates whether the condition of the circuit is a normal load, a normal switching event . . . or an arcing fault event". But though this detector covers a wide range of events, still, a long switching event might load the capacitor beyond the selected charge level, and cause a false alarm.

Other drawbacks of the Brooks et al. system are: 1) the use of a blocking filter for each load in order to diminish spurious noise, which also diminishes the protected portion of the circuit; and 2) the discharge of the capacitor deletes valuable information, about suspicious events, that might enable an early detection of evolving problems.

U.S. Pat. No. 5,726,577 (Engel), issued in March 1998, discloses a detector for series arcs in AC circuits. This detector generates signals representing the second derivative of the current, which signals contain pulses in response to discontinuities in the current. The continuity properties of arcing current are very regular at currents too low to blow the arc apart; indeed, "the current is more continuous, except for discontinuities at current zero crossings". This leads to a unique pattern of pulses, wherein a pair of pulses of opposite polarity appears, each half a cycle. On the other hand, the signal from a dimmer has a triple pulse of alternating polarities which also appears once per each half a cycle. This difference is the basis for the discrimination between pulses due to arcing and other pulses due to normal loads. However, some restrictions and drawbacks must be mentioned: This method is appropriate only for series arcing with quite low levels of currents which enable a steady and persistent arcing. But it is less appropriate for casual arcing or intermittent arcing, which have irregular behavior, with the consequence that the pair pattern is not repeated. Also, the method of U.S. Pat. No. 5,726,577 is targeted for just one dimmer and for detecting faults only in AC circuits.

U.S. Pat. No. 5,818,237 (Zuercher et al.), issued in October 1998, discloses a detector for arcing faults. It tracks the envelope of the current signal, and differentiates it. Thus a di/dt signal is generated that contains pulses in response to step increases in the current. The detector analyzes the pulses and rejects those that appear at a rate equal to, or higher than, the frequency of the power supply. In this way, the detector succeeds in eliminating pulses produced by loads such as dimmers; while the other pulses are counted, and after a predetermined number is attained within a predefined time interval, the detector actuates the current breaker. This detector cannot discriminate between signals of a true arcing fault and those of a normal load, since both contain pulses of random time spacing. For example, signals produced by a programmed washing machine, a prolonged switch operation, or other abused switch operation, contain pulses that are separated enough to be counted; the accumulation might be quite rapid, thus leading to a false alarm.

Other prior art fault detectors monitor and analyze high frequency noise. For example, U.S. Pat. No. 5,729,145 (Blades), issued in March 1998, detects arcing "by monitoring the power waveform for wide band high frequency noise, and examining the detected noise for patterns of variation in its amplitude synchronized to the power waveform". This works according to the notion that each time the AC voltage across the air gap falls below the arcing threshold voltage, the arc is quenched, and RF noise ceases. These time gaps appear in synchronization with the power waveform.

Blades' method does not account for the short (less than half-periods) or irregular bursts of sparks that often characterize initial stages of fault development. Consequently, the alert according to Blades' method is given at a relatively late stage of the arc build-up, which might be hours or even days after the initial stages. Also, this method is intended only for AC power systems.

U.S. Pat. No. 5,835,321 (Ems et al.), issued in November 1998, discloses a detector that looks "for the presence of low frequency noise for a selectable number of cycles of the AC current". But since switching operations usually create broad band noise and the switching events are not identified and are not excluded, some of them, especially those due to long switching operations, accumulate and lead to false alarms.

The limitations and deficiencies of the above and of other prior art detectors and of less recent models show that there is still a need for a detector that effectively and reliably discriminates between arcing signals and signals from valid sources. Specifically, there is a need for a detector that is capable of providing early warning of an incipient arcing fault.

SUMMARY OF THE INVENTION

It is an object of the present invention to provide a method and an apparatus for detecting an arcing fault in both AC and DC electrical systems.

It is another object of the invention to provide a warning of improper conduction or insulation conditions at an early stage of development.

It is still another object of the present invention to discriminate between a true arcing fault and the normal operation of switches, loads and dimmers.

To achieve the above purposes, the detector of the invention monitors the discontinuities in the current flowing in the electrical line, while converting the corresponding fast transients into discrete pulses, which are then analyzed in the following steps.

1) Dimmers are identified by their producing signals of equal time-spacing, which usually is either a half or a full period of the power supply. The corresponding pulses are then omitted.
2) Other equally time-spaced pulses, like those of a relaxation oscillator, night be identified by looking for an equal time interval between consecutive pulses or between the each other pulses. The matching pulses are then also omitted.
3) Normal switching operations, dangerous arcing processes and other arcing activity, are identified and discriminated along the following two categories: The category of undeveloped arcs (i.e. sparks or intermittent arcs), and the category of developed arcs:
   i) The category of undeveloped arcs;
      As a result of a normal switching operation the current amplitude is definitely changed, while after an event of arcing fault the current amplitude sometimes changes and sometimes retains its previous value. Therefore, a zero change in the current following an RF event, suggests that improper electrical condition is being formed, though, not necessarily dangerous. Such arcing events, to be called hereinafter as faulty events, are accumulated for the sake of further assessment of the situation severity.
      Long events are considered to belong to the next category.
   ii) The category of developed arcs:
      This category deals with RF events that are longer than a predefined period called T-ARC, which is typically taken to be 2 seconds. Such events are call arcing states.
      Long RF events characterize an arcing process, and are rarely due to a switching operation. Therefore, since dimmer and pulsed circuit events have already been excluded out, it is probable that a sufficiently long event signifies the existence of an arcing fault. Again, for the sake of obtaining a good statistics before concluding the exsitence of a problem, the durations of long events are accumulated. As a matter of convenience, to each arcing state, there is attached a number of equivalent arcing events, that is equal to duration of the arcing state expressed in seconds.

The counting in each category is restarted once a day or so, according to the required sensitivity.

Before ending the analysis of the pulses two points should be mentioned:
I) Electromagnetic interference scarcely infuence the detector because of the strong damping effect along the power lines. The detector itself, on being closed in an electric board, is usually far enough from e.m. sources. Also it can be shielded whenever necessary.
II) Electric machines generate e.m. noise which contains a lot of RF components. However their amplitudes are usually small. Consequently, an appropriate threshold can be chosen so as to avoid the conversion of the noise into pulses More particularly, the invention relates to method for the early detection of faults in an electric supply system, which comprises the steps of (a) Continuously checking the existence of RF transients on the electric supply system line; (b) Transforming detected transients whose amplitude is above a predetermined level, into a sequence of pulses; (c) Analyzing the temporal spacing between pulses to identify those which are due to dimmers, and disregarding them; (d) Identifying short-noisy states structures in said sequence, states whose duration is shorter than a period T-ARC. (e) Determining short-noisy states where the current amplitudes before and after said states are different, and disregarding these states considered to be caused by normal switching operations; (i) Regarding each of the remaining short-noisy states as a faulty event and accumulating such events in a first register; (g) Identifying separately long-noisy states in said sequence, states whose duration is longer than a period T-ARC; (h) Ascribing a number of arcing events to each long-noisy state proportional to its duration, and accumulating these numbers in a second register; (i) Summing the values in said first and second registers, and if the sum exceeds a predetermined value N-ALARM, within a predetermined period, activating an alarm and/or a current breaker;

According to a more preferred embodiment of the invention, the summing step comprises the steps of: (a) Actuating an alarm and/or a current breaker if the accumulated number of the arcing events exceeds a predetermined value N-ALARM, within a predetermined period; (b) Activating a warning sign if the accumulated number of faulty events exceeds a predetermined value N-WARNING, within a predetermined period.

Preferably, in said more preferred embodiment N-ALARM and N-WARNING are separately defined according to the required detection sensitivity and the electric environment.

Preferably, the method also comprises the step of actuating an alarm or/and interrupting the current upon detecting of a sequence of pulses, exceeding a predetermined period of T-LONG-ARC.

Preferably, N-ALARM is predefined according to the required detection sensitivity and according to the electric environment.

Preferably, the identification of pulses due to dimmers is accomplished by (a) Determining pulses due to a dimmer by detecting a time spacing between two consecutive pulses, that equals a full or half a cycle; (b) Determining pulses due to n dimmers by detecting a time interval between a pulse and n pulses later that equals a full or half a cycle;

Preferably, the identification of pulses due to a valid switching is carried out by determining a following change in the current amplitude in the electrical line, which exceeds a predetermined value I-MIN;

Preferably, a sequence of pulses is defined as a noisy state provided that any two consecutive pulses constituting the state are separated by less than a duration T-QUIET.

Preferably, the determination of a following change in the current, is based on the following four perceptions:
i. After the passage of a spark, as well as when a short arc is over, there is a considerable probability that the current will return to its previous value.
ii. The period before this return takes place, is random and might as well be much shorter than one second.
iii. The statistical expectation of the pause between two normal switching operations, in an everyday circuit, is greater than one second.
iv. After a switch is turned ON or OFF the current is definitely changed, while quite adversely, after a faulty event the current will sometimes be changed and sometimes will remain unchanged.

Preferably, T-LONG-ARC is in the range of 3 seconds up to 50 seconds, and T-ARC is in the range of between 0.7 seconds and 3 seconds.

Preferably, T-QUIET is in the range of between 0.1 to 1.0 second.

The invention also relates to an apparatus for detecting faults in an electric supply system, which comprises:
a. Means for sensing RF transients on the electrical line;
b. Means for transforming the RF transients into a sequence of pulses;
c. Means for analyzing the pulses, and discarding those, if any, that are found to be originated from dimmers and those which are due to valid switching.
d. Means for further analyzing the sequence of the rest of the pulses to find according to their duration a number of arcing events or a faulty event;
e. Means for counting faulty events and arcing events; and
f. Means for alerting when the sum of detected faulty events and arcing events exceeds a predetermined number N-ALARM Preferably, the means for finding a valid switching comprises a current measuring device for detecting a current change in the electrical line that follows RF transients on the line.

DETAILED DESCRIPTION OF THE PREFERRED EMBODIMENT

The insulation of electrical lines is subject to degradation with time due to various mechanical and environmental conditions. For example, the contacts in electrical networks are usually hotter than the line conductors, due to surface and lattice irregularities that lead to excessive Joule heating; such heating carbonizes and degrades the insulators in the vicinity of the contact.

The conductivity at the contacts is degraded as well, due to various mechanical and environmental conditions. For example, mechanical vibrations, especially in electrical machines, gradually loosen the screws at the conductor connections, resulting in a resistance increase at the connection. Other contributing factors are oxidation and dust particles at the contacts, humidity, high temperatures that distort the structure of the conductors, etc. All these factors lead to a resistance increase, and ultimately to a deterioration in the contact functioning.

Eventually, this can develop into a situation in which the current passes through a tiny air gap, either at a loose contact, or between an AC phase conductor and insufficiently insulated neutral or ground conductors. The first situation, in which the current flows through a tiny ionized air gap in the contact and through the load, is usually called series arcing, and the second is sometimes called a parallel or a short circuit-arcing. These are situations leading to the formation of arcs or short sparks.

The present invention provides a method and means for detecting such improper situations at their early stage of development. This is particularly advantageous in electric systems that are left unattended, or in industry where a sudden interrupt of the current supply might cause a lot of damage to production lines.

Some of the arcing characteristics that constitute the basis for the present invention will now be described.

Arcing is the passage of current through a small air gap that separates two conducting parts, and it is a very unstable phenomenon. More particularly, the phenomenon is characterized by rapid variations in the conduction parameters. Specifically, the current fluctuates with random intermissions.

A well known fact is that during an abrupt or rapid change in the parameters of an electrical system, a radio-frequency (RF) transient is inevitably formed; wherein the current is oscillating at RF frequency and decays exponentially within microseconds or less to a new "steady" state. This behavior exists, for example, at a normal opening or closure of a switch. During such operations there exist situations in which the conducting parts are close enough, during a short period, to enable the formation of a short arc, in which current passes though the air gap between the adjacent conductors. The process involves abrupt variations of the electrical parameters, and consequently RF transients are formed. The process of turning ON an additional load in an electrical circuit involves the following stages: Initially, prior to switching, there is a steady state with a current $I_1$ that flows through some of the existing parallel loads of the circuit. Then, there is an arcing stage that is characterized by the appearance of current fluctuations and of many RF signals. This stage might well be called a "noisy" or "unstable" state. A few microseconds later, the RF fluctuations decay into a new current I2, that persists for seconds or more, until the next switching operation. Sometimes, due to mechanical bouncing of the switch contacts, the RF activity lasts up to a few milliseconds.

A more exact definition of the various states involved in an electrical supply system is given below:

A time interval which is bounded by two RF events, and does not contain RF events in its interior, and is longer than a selected minimal predefined time period—T-QUIET, is referred to herein as a "stationary" or "quiet" state. The predefined duration of T-QUIET may be, for example, 25 cycles of the AC, i.e., about 0.5 second. A "quiet" or "stationary" state is also a time interval that is bounded only on one side or is unbounded, that contains no RF events and is longer than T-QUIET The minimal duration of a quiet state is called herein, T-QUIET. The predefined value of T-QUIET should be bounded from above so as to ensure that the statistically expected pause between two normal switching operations (clearly longer than 1 second) will indeed belong to the category of quiet states. At the same time, T-QUIET should be bounded also from below, since as will be more explained hereinafter, it forms a time base for an accurate determination of the current amplitude.

Figure 1:
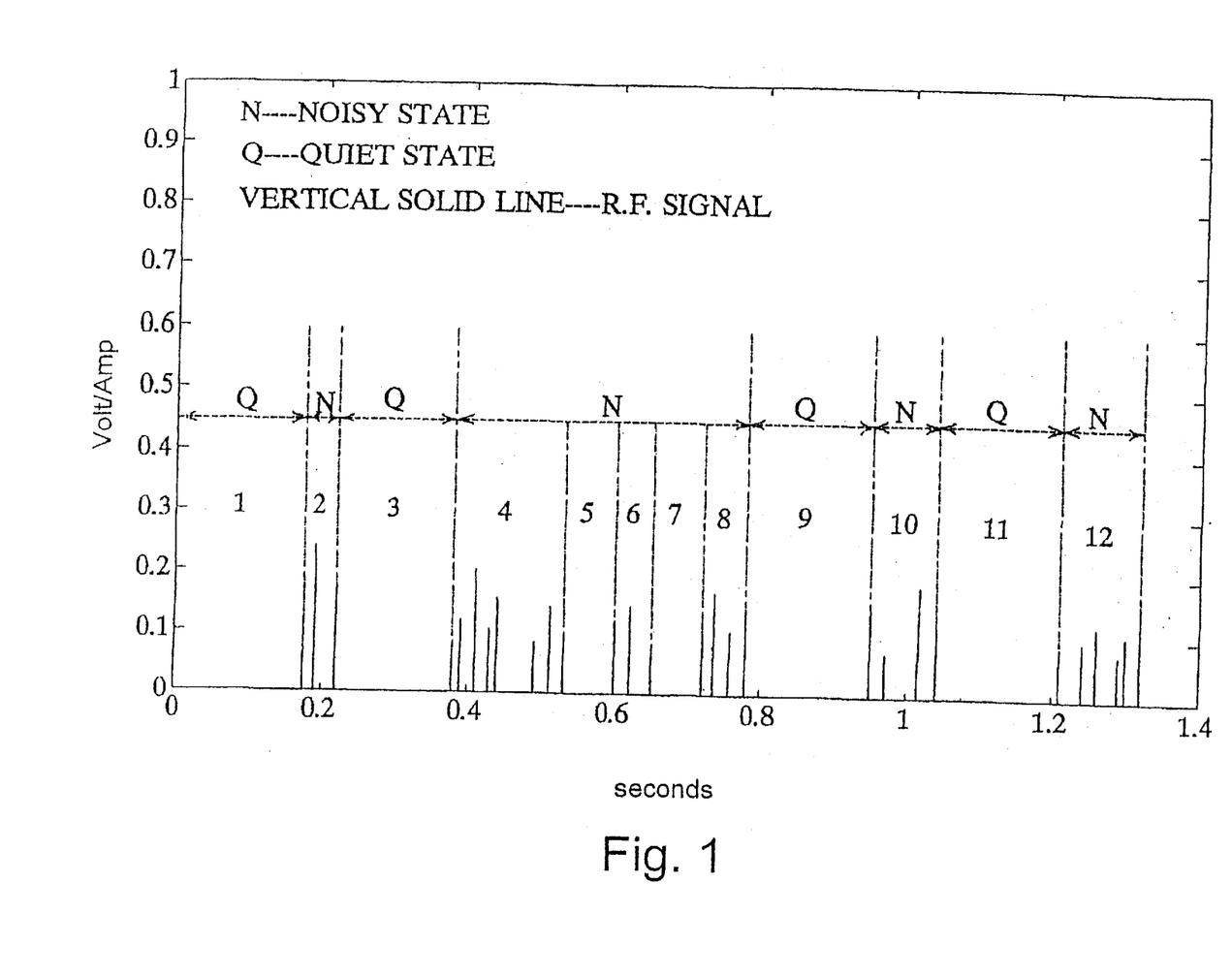
FIG. 1 is a schematic diagram of a typical time sequence of RF signals, illustrating the manner in which the "noisy-states" (N), and the "quiet-states" (Q), are determined.

A time interval that is bounded by two RF events, that does not contain any quiet state, but might contain additional RF events, is referred to herein as a noisy or an unsteady state. Obviously, an interval bounded by two RP events, of shorter duration than T-QUIET, is either unsteady, or a part of a larger unsteady state, irrespective of its contents. FIG. 1, which will be discussed in more detail hereinafter, illustrates these situations.

Three categories of arcs are defined according to their temporal behavior:

a) persistent arcing. This is a situation in which current flows almost continuously through a small air gap in series with a legitimate load. However, arcing is very unstable and because of erosion at the contacts, for example, there are considerable fluctuations, especially from one conducting state to another, accompanied by many RF signals. The current usually terminates at the points of the zero voltage level of each cycle, but the fluctuations take place at random points of the cycle, and thus the whole cycle might show RF activity. Such a state is called herein an "arcing state". More specifically, an arcing state is a noisy state lasting longer than a predefined period referred to herein as T-ARC. T-ARC may be defied to be, for example, 2 seconds, persistent arcs usually liberate a considerable amount of heat that might cause a fire.

b) intermittent arcing—This situation constitutes a sequence of leaps from a stationary state, with or without a current, to a noisy state, and then after some time, back to a stationary state. This can happen, for example, when a small air gap is temporarily formed at a loose contact, or when conducting parts with worn insulation approach one another due to mechanical vibrations, etc. The duration of the circuit in the noisy state, before returning to its original or to another stationary state, varies quite randomly, due to the unstable nature of the arcing phenomenon. Specifically, the duration might drop below the period of one cycle of the network. In contradistinction, the steady conducting or non-conducting states might persist for many seconds. Clearly, there is a significant probability that after one or a few such current jumps, the system will return to one of its previous stationary states. Therefore, measurements of the current in a few successive stationary states will eventually reproduce one of the previously measured current values;

c) a spark or casual arcing—This is a very short RF current burst, and when it is over, the current usually returns to its original value. The time scale of a spark or casual arcing is generally less than a fraction of a second Sparks and intermittent arcs liberate less heat and are less dangerous in terms of causing fire. The importance of their detection, though, lies in signifying the evolution of improper electrical conditions with the potential of causing more damage in the future.

A dimmer controlled load commonly generates similar transients. More particularly, a dimmer has the unique feature wherein, in each half cycle, the controlled load (lamp, for example) is turned "ON" at a fixed phase of the AC cycle, with the generation of similar transients.

Another source for RF signals in electric lines is electric motors. Today, most electric motors are of the induction type, which produces only a low level of RF noise, while motors having commutators, which produce heavy RF noise, are seldom used. Also, most electric motors are generally well equipped with means for filtering out the RF signals.

The above definitions and classifications of states are clarified by the example given in FIG. 1, which refers to a typical intermittent arcing. FIG. 1 shows schematically random time distribution of RF signals, and the correspondingly defined states. Suppose sections 1, 3, 4, 9, 11, and 12 are longer than T-QUIET, but shorter than T-ARC, while the other sections are shorter than T-QUIET. Then the states 1, 3, 9 and 11 would meet the definition of a quiet state, while the states 2, 4+5+6+7+8, 10, and 12 fit the definition of a noisy state.

In the case of intermittent arcing which starts, for example, from a no-current state, it is expected that one of the successive stationary states, will, as well, be a no-current state.

An arcing event, in which the noisy-state is bounded by two stationary states of equal currents, is more hidden to the casual user than an arcing event which is followed by a significant change in the current. Indeed, in the second case, where arcing takes place with a transition from a conducting to a non-conducting state, there is a considerable change in the circuit state, which has the effect of, for example, turning "OFF" the lights, a phenomenon that can be easily noticed as an unexpected change. Since in the first case, the changes are minor, the fault might remain hidden from the user, and an arcing detector is needed. The present detector is especially sensitive to those arcing faults involving minor current changes.

The appearance of transients over the electrical lines might have been a straightforward warning against arcing and improper electrical conditions. However, such transients can also be generated by the normal operation of switches, or by phase-controlled devices such as lamp dimmers. Therefore, the discrimination between transients that are due to normal switch or dimmer operations and those due to an arcing fault, is very crucial. A high rate of RF signals cannot by itself be an indication of arcing, since, for example, a slow release of the trigger of an electric tool or a prolonged misuse of a proper switch, also generate such high rate signals.

The discrimination between the signals is based, according to the present invention, on three properties:
1) The different temporal spacing of the transients which are due to dimmers, normal (valid) switching and arcs.
2) The inevitable variance of the current under the switching of a normal load as opposed to a possible invariance of it under arcing events.
3) The relatively low intensity of the RF noise which is due to the action of electric motors.

The first two properties are derived from the following characteristics of the RF sources:

Normal switching operation. Such an operation causes a transition from one distinct conducting state to another state, which on the average, persists for seconds or more, and involves a considerable change in the average current.

Persistent arcing. A persistent arcing generates many RF signals at various phase points of the cycle, with only short pauses in the current.

Intermittent arcing—An intermittent arcing causes ongoing transitions from a stationary conducting or non-conducting state to an unsteady noisy state and vice versa. The lifetime of the unsteady state is very short, usually less than a second. The average currents in the stationary state before and after the noisy state, are sometimes equal and sometimes are not, and each possibility has a quite considerable probability.

A spark or a casual arcing generates a very short current burst, at the end of which the current usually returns to its original value. The time scale is less than a fraction of a second.

Dimmer action—generates RF transients at a certain phase on the cycle with equal time spacing. Other portions of the cycle have a very poor RF activity.

These characteristics constitute the basis of the present method for providing a reliable discrimination between normal and abnormal activities.

Arc Detection Procedure for AC Circuits

The detector of the invention can be applied to detect arcing faults in both AC and DC lines. The following description illustrates how the detection is obtained in each case.

The RF transients are transformed by the detector into distinct pulses. These are analyzed with respect to their temporal spacing and with respect to the current changes involved.

In the first step of the procedure, pulses due to dimmers are identified and discarded as follows: The pulses due to a dimmer are usually spaced apart by a full or half cycle of the AC frequency. Accordingly, a simple logic is set to check the pauses between successive pulses, and if they equal that amount, the corresponding pulses are discarded. Other pulses, if any, are passed to the second step of the analysis, together with dimmer pulses that share common cycles. This procedure is easily generalized to a few dimmers working simultaneously, by checking whether the sum of successive pauses between the pulses equals half or a full cycle.

In the second step, the remaining pulses are analyzed. The pulses due to normal switching, on the one hand, and those due to casual or intermittent arcing fault, on the other hand, are identified. Normal switching operations are distinguished from arcing fault activity by the adverse current changes involved, as follows:

First, the current amplitude in the stationary state that precedes the RF event, and the amplitude in the stationary state that follows, are determined. The determination is performed by measuring the instantaneous currents and by appropriately calculating their time averages.

Then, the current amplitudes, 'before' and 'after' the RF event, are compared. As discussed before, the current amplitudes before and after a normal switching event are definitely unequal, while in the case of an arcing fault event, the amplitudes sometimes are equal and sometimes are not. Good discrimination is obtained by an ongoing measurement and comparison of the current levels before and after the RF event. As previously discussed, during an intermittent arcing, the current jumps from stationary states, to fluctuating unstable states, and vice versa. Therefore, an ongoing comparison will, sooner or later, meet a configuration in which a noisy state takes place between two stationary equal current states. This is definitely not in accordance with a switching behavior, and is good statistical indication of an arcing fault. Such a noisy state is therefore considered to be a faulty event, and it is added to the previously accumulated faulty events.

An optional algorithm for the current-change-test is the comparison of the current amplitude before the RF event, with the amplitudes of each of the stationary states that follows it, during a time period to be referred to as T-COMPARE (for example, 1 second). This accelerates the contribution from a true arcing fault to the accumulation of the faulty events, while an unwanted contribution to the accumulation from normal events, wherein valid loads are turned 'ON' and 'OFF' during T-COMPARE is negligible.

To complete the concept of checking an AC line for the existence of a faulty event, some specific definitions and statements are provided:

The current amplitude is determined only in stationary states, i.e., in time intervals that contain no pulses and are longer than T-QUIET The current amplitude is defined herein as the average current of the positive instantaneous current, taken over a certain integral number of successive cycles In order to obtain a good accuracy, the average current is calculated by a time integration over a few cycles, for example 25 cycles, each cycle containing, for example, 200 points of integration. This number of cycles used for carrying out the average current calculation is denoted by N-CYC. The average amplitude is updated after the completion of each cycle. Obviously, the current amplitude is not determined during noisy states.

Summary of the current-change-test: If the current amplitudes before and after a noisy event differ by at least a predetermined level I-MIN, wherein I-MIN equals, for example, 0.1A, then this event is determined to be due to a normal switching operation, and therefore the event is disregarded. However, if the current amplitudes before and after a noisy event are found to be essentially equal, to within I-MIN, then the event is determined to signify a faulty event. The faulty events are accumulated for a further assessment of the situation severity. In the above, a noisy event stands for either a single pulse of an RF transient or a noisy state with few pulses.

According to this procedure, pulses that are originated from a real normal switching operation are ignored, as they should. However those that are originated from a true arcing fault are only partially taken into account, and partially ignored; this depends on whether there was enough time for the system to return to its previous conducting state during the current-change-test, i.e. during the period T-COMPARE.

Since the analysis is based on the assumptions of probable and improbable events, the conclusions are valid only in the statistical sense. Therefore, only after a certain number of faulty events are counted, the situation is concluded as faulty, and measures are taken as will be explained at the end of this procedure.

In the third step of the procedure, arcing states, i.e., noisy states that are longer than T-ARC (as predefined), are considered.

Those long sequences of pulses are not subjected to the current-change-test, since their duration, alone, is a significant indication of an arcing fault; clearly, such long sequences can be primarily due to an arcing fault, while only rarely they can be due to either prolonged abuse of a switch, a triggering of an electric motor; or the successive operating of many switches. Also they absolutely can not be due to the operation of a dimmer whose pulses have already been discarded. Therefore, the appearance of long sequences of pulses is highly suspected as an indication of an arcing fault. For obtaining a good statistics, the data is conveniently accumulated as follows: To each arcing state, there is attached a number of equivalent arcing events, that is equal to the duration of the arcing state expressed in seconds, and this is the number which is accumulated.

Noisy states shorter than T-ARC are excluded and their duration is not accumulated, since pulse sequences up to this duration might also be generated from the normal operation of, for example, the activation of the trigger of a drilling machine. It should be noted, however, that these noisy states have been already been subjected to the current-change-test in the preceding step of the analysis procedure.

On top of this, very long arcing states have a special role. States longer than a predefined period called herein T-LONG-ARC of, for example, 15 seconds, are designed to immediately activate the alarm or/and the current breaker.

In the last step of the procedure, a conclusion is made about the severity of the fault, and measures are taken:

Whenever the combined sum of the accumulated faulty events and of the accumulated arcing events exceeds a predetermined number called N-ALARM within a predetermined period, then it is concluded that a problem exists. In this case, an alarm or/and a current breaker are actuated.

The value of N-ALARM might be chosen in the range from few tens to few thousands, depending on the required sensitivity, and the relevant electric environment. A typical value of 100 assures that an active arc would be detected in about 100 seconds. The counting is reset each day or every few hours.

In a second, more preferred embodiment of the invention, the faulty events are considered to be less dangerous than the arcing events and are treated separately thereof Accordingly, measures are taken as follows:

I) If the accumulated number of faulty events, exceeds a predetermined number N-WARNING within a predetermined period, a warning sign is given; However, II) If the accumulated number of arcing events exceeds N-ALARM within a predetermined period, the alarm and/or a current breaker are activated.

As before, N-ALARM as well as N-WARNING might be chosen in the range from few tens to few thousands depending on the required sensitivity, and the relevant electric environment. Typical values are of 100 for N-ALARM and 1000 for N-WARNING. The counting is reset each day or every several hours.

Altogether, the above procedure of the invention enables an early detection of an arcing fault, with a sensitivity degree at will False alarms due to, for example, a prolonged misuse of switches, pressing the trigger of a drilling machine, or the operation of one or more dimmers, are eliminated.

Figure 4:
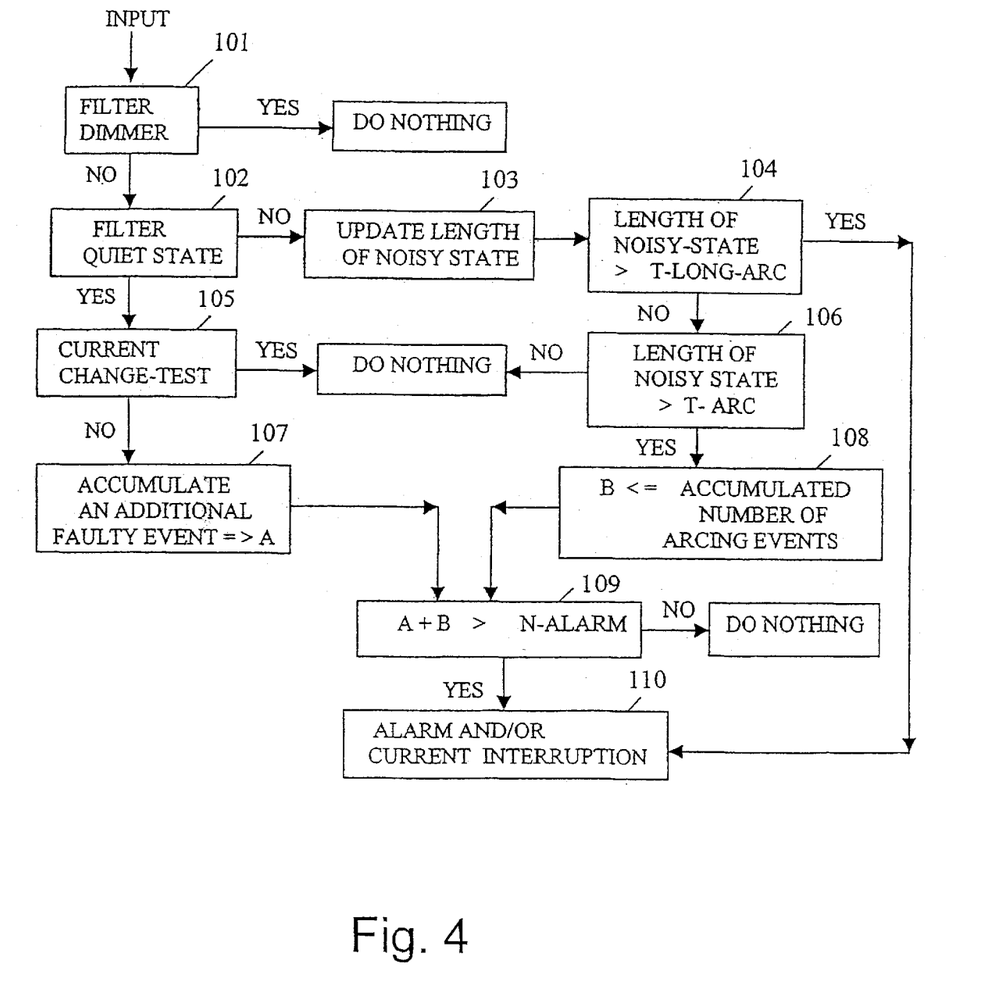
FIG. 4 is a flow chart illustrating the process for the detection of arcing faults, according to one embodiment of the invention.

FIG. 4 is an exemplified block diagram illustrating, in a somewhat simplified form, the procedure for discriminating various arcing sources, according to a first embodiment of the invention:

Step 101 of FIG. 4 represents a subroutine that identifies pulses which are due to a dimmer. This is performed by checking whether or not the pauses between the pulses last for 10 milliseconds with a possible deviation of up to about 1 ms (any multiple of 10 milliseconds up to 60 milliseconds with a same deviation is also considered as an indication of a dimmer).

Step 102 represents a subroutine that determines the "quiet" and the "noisy" states boundaries. This is performed by checking whether or not the present pulse is distanced from the previous pulse by a period longer or shorter than T-QUIET.

In step 103, the length of the last pause is updated, provided the following two conditions are met: The last pause is a noisy state, and the present pulse is close to the previous one by less than T-QUIET.

The subroutine of step 104 checks whether or not the length of the checked "noisy" state is longer than T-LONG-ARC. If it is, the alarm is activated (step 110), but if not the procedure continues to the subroutine of step 106.

In step 105, the subroutine of the current-change-test checks whether the amplitude of the current before the present pulse differs or not from the amplitude after it by at least a certain amount I-MIN. If it differs, then it is assumed that the pulse is due to a normal switching ON or OFF of a load and nothing is done. Otherwise, this is concluded to be a faulty event, and the procedure continues to step 107.

The subroutine of step 106 checks whether or not the length of the present "noisy" state is longer than T-ARC. If it is, then it is an indication of a suspected situation, and the state is considered to be an arcing state; the procedure continues to step 108.

The subroutine of step 107 adds one more faulty event to register "A" where the number of faulty events is accumulated.

The subroutine of step 108 adds to register "B" the present number of equivalent arcing events, which is numerically equal to the duration in seconds of the present arcing state.

The subroutine of step 109 checks whether the sum of the accumulated faulty events in register "A" and the accumulated arcing events in register "B" exceeds N-ALARM. If not, in step 112 no step is taken.

At step 110 an alarm is initiated and/or a current interrupter is activated.

Figure 5:
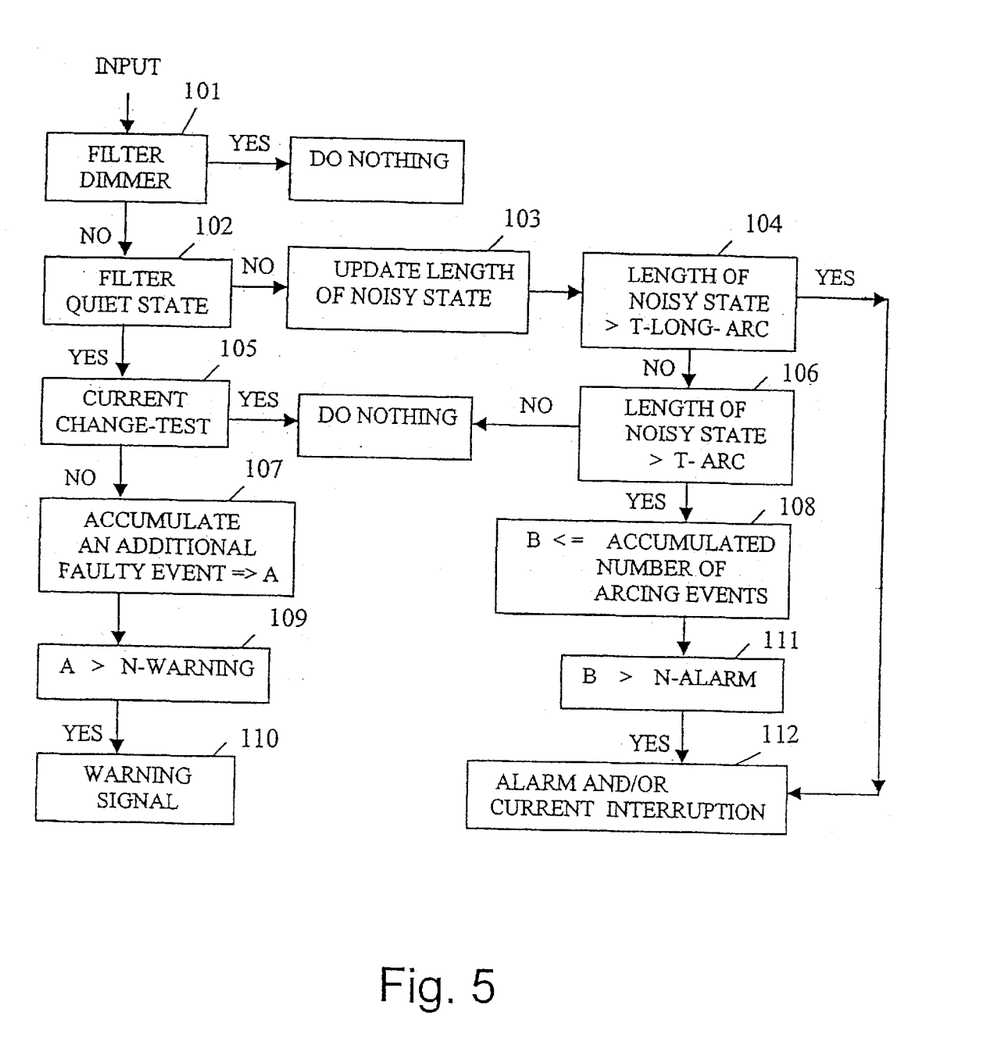
FIG. 5 is a flow chart illustrating the process for the detection of arcing faults, according to a more preferred embodiment of the invention.

FIG. 5 similarly illustrates in a simplified form a procedure for discriminating various arcing sources according to a second embodiment of the invention. This procedure is essentially identical to the procedure of the first embodiment except for the very last part beginning from step 109. Therefore, the procedure up to step 109 will not be elaborated herein, for the sake of simplicity.

The differing steps are:

The subroutine of step 109 checks whether the accumulated faulty events in register "A" exceeds N-WARNING;

At step 110 a warning signal is given;

The subroutine of step 111 checks whether the accumulated arcing events in register "B" exceeds N-ALARM; and At step 112 alarm or/and a current breaker are activated.

Arc Detection Procedure for D.C. Circuits.

The procedure for the detection of arcs in DC circuits is similar to the AC procedure, though somewhat simpler.

As before, the RF transients are transformed to countable pulses. In the first step, periodically repeating pulses are identified. Here the repetition rate is unknown to begin with, and is determined by an algorithm that checks for equal pauses between various sets of pulses. The periodic pulses are discarded.

In the next step, pulses due to normal switching operations are distinguished from the rest pulses, by the current-change-test as described before. However, the current amplitude is simply equal to the instantaneous current value. The currents just "before" and "after" the RF pulse are defined to be well out of the time-span of the transient, which depends on the specific application. The pulses due to normal switching operations are then omitted. On the other hand, a noisy state that occurs between two quiet states with equal currents is considered to be a faulty event and is taken into account.

In the next step, long RF pulse sequences are identified, and the number of equivalent arcing events are determined, as explained above for the AC case.

The alarm, the warning and the reset criteria are the same, in principle, as those of the AC case.

In order to enable a proper functioning of the detector in an "environment" of electric machines with commutators, said machines must be equipped with means for filtering the RF noise. This condition is true for DC as well as for AC circuits.

Description of the A.C. Detectors

Figure 2:
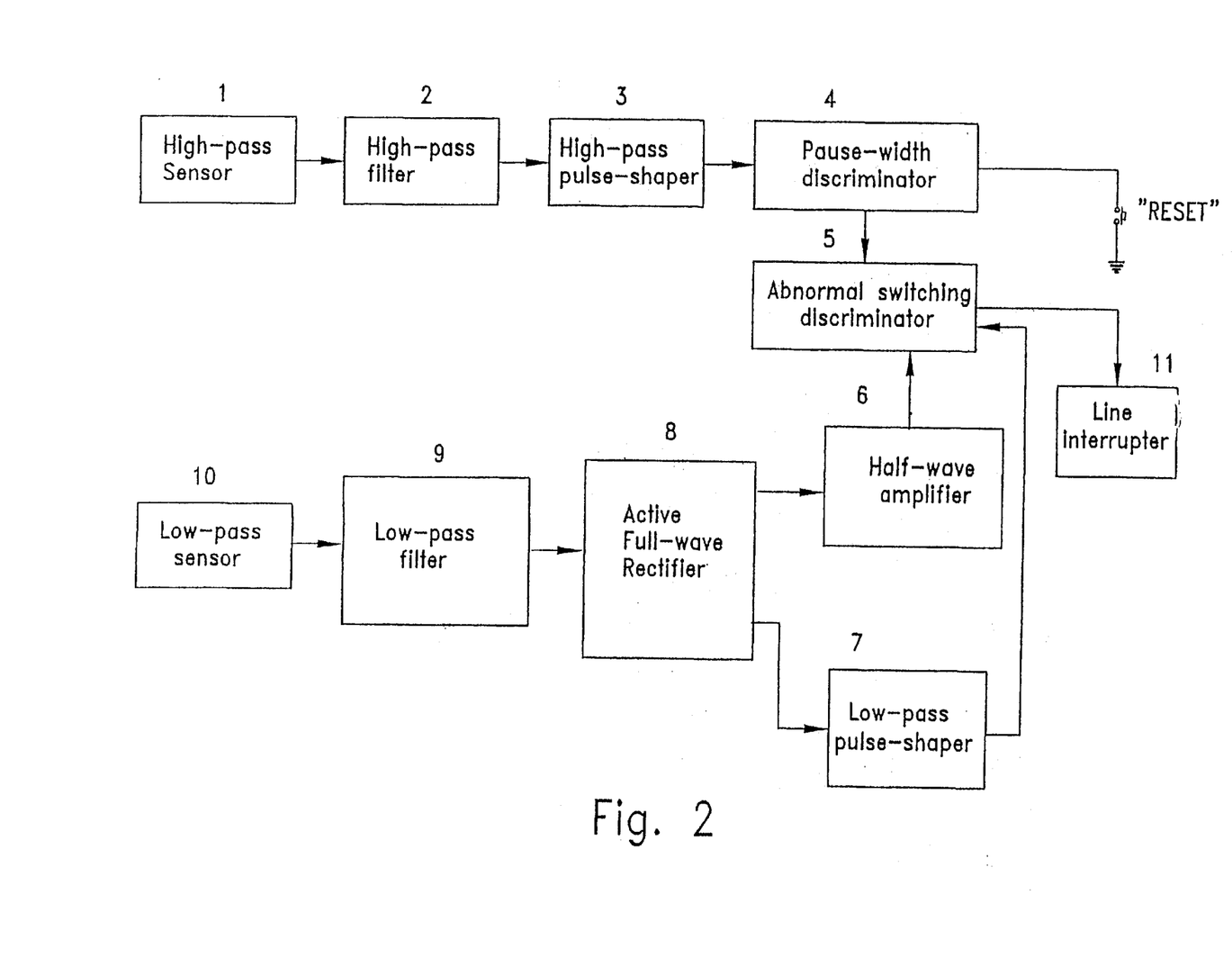
FIG. 2 is a block diagram of the AC arcing fault detector, according to an embodiment of the invention.

A preferred embodiment of a detector concept, as designed for detecting faults in an AC circuit, is described in block diagram form in FIG. 2.

The high-pass sensor 1 is intended for the detection and transmission of high frequency signals (>100 kHz). The sensor is situated on the load line or on the entrance to a whole section of the electric network. The high frequency current changes in the line induce high frequency signals in the sensor, which are directed through high-pass filter 2 to the high-pass pulse shaper 3.

The high-pass pulse shaper 3 transforms the signals which are above a predetermined voltage level into square pulses of equal height and directs them to the pause-width discriminator 4.

The pause-width discriminator 4 checks for the presence of dimmers and other phase-controlled devices; it measures the pauses between successive pulses, and then the pulses that are separated by, for example, 9–11 milliseconds in a 50 Hz system, are discarded. These pulses are not considered, of course, as faulty events and should not be taken into account. The remaining pulses are conveyed to the abnormal-switching discriminator 5.

The abnormal-switching discriminator 5 determines whether the pulses are due to a normal switching operation, or due to abnormal arc activity. For this purpose, the abnormal-switching discriminator 5 calculates the average currents 'before' and 'after' the pulse (or pulse sequence).

If the average currents before and after differ by at least I-MIN (wherein I-MIN is selected as, for instance, 0.1A), then it usually means that the pulse or the sequence of pulses was generated by a normal switching operation and the event is not counted as a faulty event. If the average currents differ by less than I-MIN, then it usually means that the pulse or the sequence did not result from a normal switching operation and it is counted as a faulty event.

Abnormal-switching discriminator 5 also analyzes long pulse sequences; it determines the length of the noisy intervals, and the corresponding number of equivalent arcing events and retains the total number.

If the sum of the accumulated faulty events and the accumulated arcing events reaches the predetermined number N-ALARM, for example, 100 per a half day cycle, then abnormal-switching discriminator 5 activates an alarm and/or sends a signal to a line interrupter to disconnect the load. Also in situations in which the noisy interval is longer than T-LONG-ARC, for example, 15 seconds, an alarm is immediately activated, or a current interrupter is activated.

In the second embodiment of the invention the response of the apparatus of the invention has two options; 1) A mild option: whenever the accumulated number of faulty events exceeds N-WARNING, a warning signal is activated; and 2) A vigorous option: whenever the accumulated number of arcing events exceeds N-ALARM, an alarm is activated and/or the current is interrupted.

In order to calculate average currents, the abnormal-switching discriminator 5 must accept the instantaneous current values. Low-pass sensor 10, low-pass filter 9, active full-wave rectifier 8, half-wave amplifier 6 and low-pass pulse shaper 7 carry out that task.

The low-pass sensor 10 detects changes of 50 or 60 Hz, and generates corresponding signals. Those are sent through the low-pass filter 9 to the active full-wave rectifier 8.

The low-pass pulse shaper 7 forms square pulses of the same duration and phase as of the wave at the output of the half-wave amplifier 6. Positive and negative edges of those pulses allow the determination of the zero current points, and on their base, to calculate an accurate value of average current over definite number of cycles.

Calculation of average current is carried out by the abnormal-switching discriminator 5 on the base of, for example, 200 measurements per every cycle during, for example, 25 cycles.

The switch Reset is intended for the initialization of the decoder. This is automatically done once a day or once every few hours, as defined.

Figure 3:
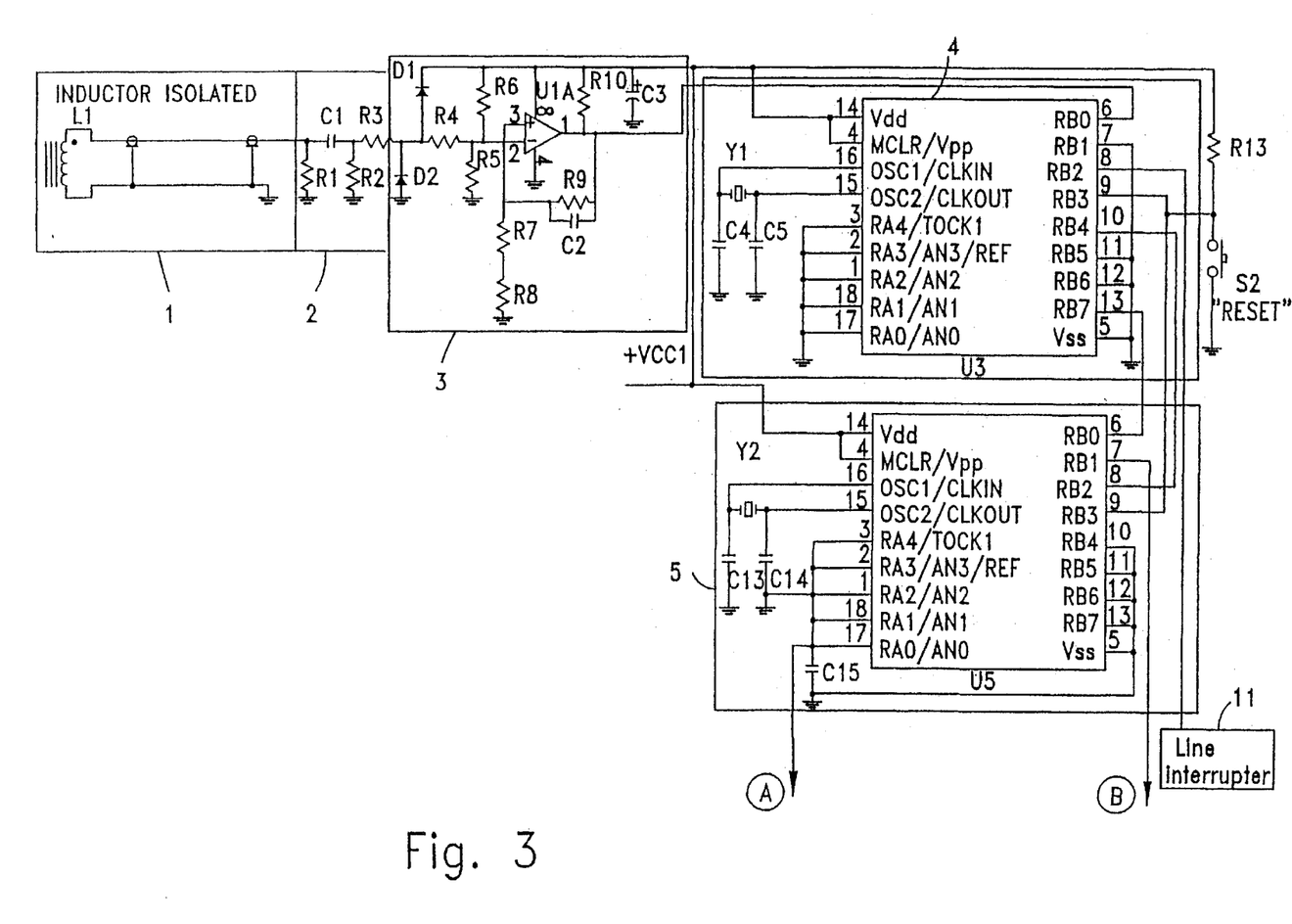
FIG. 3 is a circuit diagram of the AC arcing fault detector. Examples of component values for this detector are given in FIG. 6.

FIG. 3 illustrates an arcing fault detector, according to one embodiment of the invention.

The high-pass sensor 1 and the low-pass sensor 10 are coils, which are wound on two cores that surround the load line. One is intended for sensing high-frequency electromagnetic waves and the other for sensing the low-frequency waves; correspondingly, they differ in the material of their cores.

Figure 6:
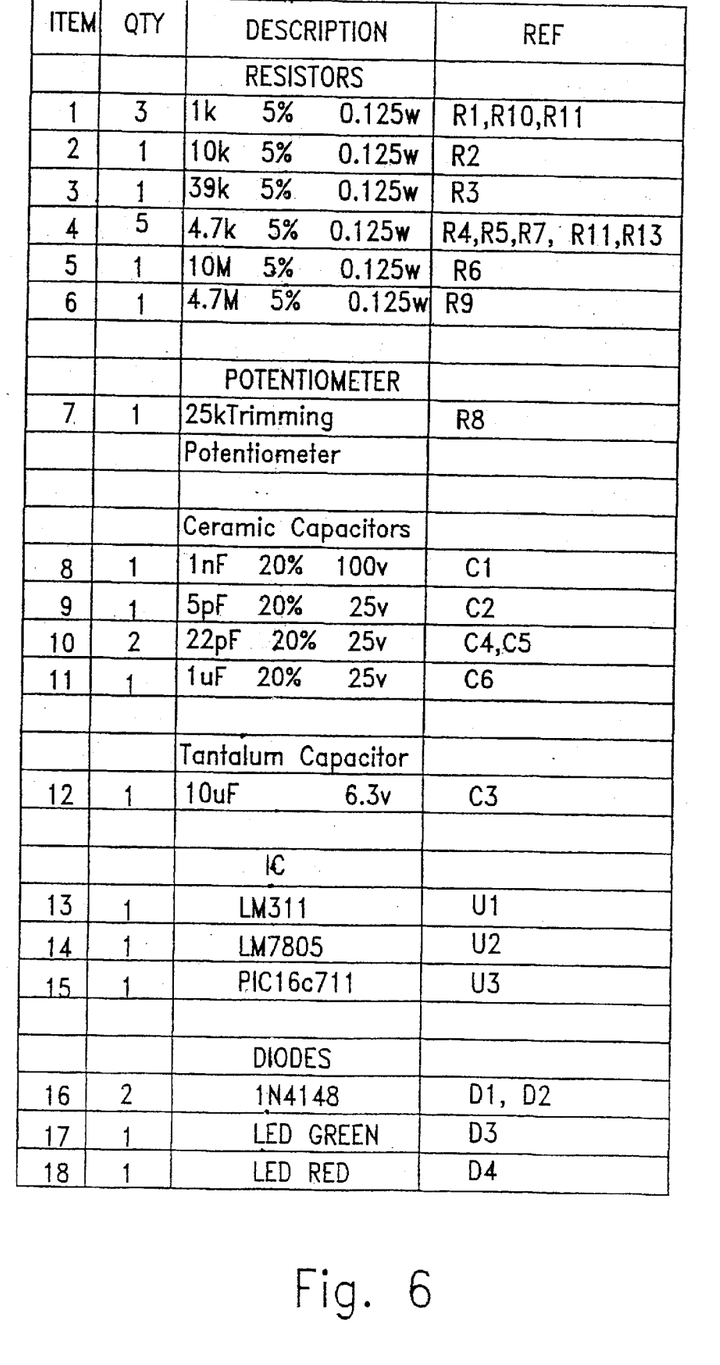
FIG. 6 is a table providing some specific values for the components of the apparatus of FIG. 3, according to one specific embodiment of the invention.

The high-pass filter 2 consists of capacitor C1 and resistors R1, R2, having values as indicated in the table FIG. 6.

The high-pass pulse shaper 3 comprises an operational amplifier U1 A with a very high coefficient of positive feedback.

The low-path filter 9 comprises an operational amplifier U4A, with a negative feedback.

The active full-wave rectifier 8 comprises an operational amplifier U4B and two Zener diodes, D5 and D6.

The half-wave amplifier 6 comprises an operational amplifier U4C with a negative feedback.

The low-path pulse shaper 7 comprises an operational amplifier U4D, and works as a comparator of half-wave.

The line interrupter 11 may be a current breaker of the electric network.

The pause-width discriminator 4 and the abnormal-switching discriminator 5 are embodied by the two microcontrollers of the type, for example, PIC16cXXX.

An example for possible values of the components of the circuit of FIG. 3 is given in FIG. 6.

The detector itself is mounted, preferably, at the central electric distribution board. Its two sensors are coupled to the electric line of the particular branch that is to be checked and protected by the detector. An overall protection of all branches of the network may be obtained by using several detectors or by a somewhat generalized detector that has a few pairs of sensors, each being coupled to another branch. In that case, all the sensors feed a same detector having a same structure as described in FIG. 2, but with a plurality of sensors. The processors analyze separately the signals from each pair of sensors and the faulty branch can be identified.

Description of the D.C. Detector

The basis of the DC detector is similar to the one of the AC detector, i.e. sensing the RF transients, transforming these transients into countable pulses, analyzing the temporal characteristics of the RF pulses, and performing the current-change-test. Since in the DC case, the current amplitude is determined differently, some changes in the structure of the detector are required:

A small measurement resistor is added in series with the DC power supply. The voltage that develops on it is connected to the input of an operational amplifier. The output from the operational amplifier, which is related to the current in the circuit, is connected to a microprocessor. This enables the current-change-test.

The small measurement resistor and the operational amplifier replace the whole low frequency channel in FIG. 3, which includes: half-wave amplifier 6, low-pass pulse shaper 7, active full-wave rectifier 8, low-pass filter 9, and low-pass sensor 10.

One microprocessor is enough for all the analysis, in the DC case. The values of the measurement resistor and the other components of the detector depend on the specific type of the working frame.

EXAMPLES

In order to explain the present invention, some preferred numerical values were assumed. Specifically, the following values were assumed:

1) 0.5 second for T-QUIET in the definition of the quiet state. But T-QUIET might be in the range of 0.1–1.0 seconds.
2) 2 seconds for T-ARC in the definition of the arcing, state. T-ARC might be in the range of 0.7–3 seconds.
3) 15 seconds for T-LONG-ARC for giving an immediate alarm sign. T-LONG-ARC might be in the range of 4–50 seconds, depending on the required sensitivity.
4) 1 second for T-COMPARE, which is the duration of the current-change-test that takes place after an RF event. T-COMPARE might be in the range of 0.5–2.0 seconds.
5) 25 cycles for N-CYC, which is the number of cycles upon which the average current is determined. N-CYC might be in the range of 5–50 cycles.
6) 0.1 A for I-MIN, which is the threshold for concluding that the current is changed by a switching operation. The value of I-MIN depends on the maximal current in the circuit. As a rule it might be around 0.1%–0.5% of the maximal current.
7) The threshold number of faulty events, for an alarm signal, N-ALARM, was assumed as 100 events per six hours. But it might be in the range of 20 to 500 events per six hours, depending on the required sensitivity and the electric environment.
8) N-WARNING, for the second embodiment (which operates according to FIG. 5), was taken to be 100 events per 6 hours. It might be in the range 10–1000 events per 6 hours.
9) All the parameters of the preferred electronic circuit of FIG. 3 as given in FIG. 6 are only preferred values and might be changed from one embodiment of the invention to another, according to the protected electrical system, the sensitivity needed etc., Some Final remarks:

a) 50 Hz. Some of the numbers in this presentation refer specifically to a line frequency of 50 Hz, but might easily be adjusted to other line frequencies, such as 60 Hz, etc.
b) Dimmers. The present method identifies transients which are due to dimmers by the pauses between them. Alternatively, they might be identified by their appearance at a fixed phase on the cycle.
c) The current-change-test compares the current amplitudes 'before' and 'after' an RF event. Other similar tests might be devised, were other circuit parameters are compared 'before' and 'after' an RF event. For example, the voltage drop on a small measurement resistor gives similar information that might help to discriminate between a faulty event and an event which is caused due to the activation of a normal switch.

While embodiments of the invention have been given by way of illustration, it will be understood that the invention can be employed with many modifications, variations, and adaptations, without exceeding its spirit or the scope of the claims.

What is claimed is:

1. A method for the early detection of faults in an electric supply system, comprising the steps of:

continuously checking the existence of RF transients on the electric supply system line;

transforming detected transients whose amplitude is above a predetermined level, into a sequence of pulses;

analyzing the temporal spacing between pulses to identify those which are due to dimmers, and disregarding them;

identifying short-noisy states structures in said sequence, states whose duration is shorter than a period T-ARC;

determining short-noisy states where the current amplitudes before and after said states are different, and disregarding these states considered to be caused by normal switching operations;

regarding each of the remaining short-noisy states as a faulty event and accumulating such events in a first register;

identifying separately long-noisy states in said sequence, states whose duration is longer than a period T-ARC;

ascribing a number of arcing events to each long-noisy state proportional to its duration, and accumulating these numbers in a second register; and summing the values in said first and second registers, and if the sum exceeds a predetermined value N-ALARM, within a predetermined period, activating an alarm and/or a current breaker.

2. A method for the early detection of faults according to claim 1, wherein N-ALARM is predefined according to the required detection sensitivity and electric environment.

3. A method according to claim 1, wherein the identification of pulses due to dimmers is accomplished by:

determining pulses due to a dimmer by detecting a time spacing between two consecutive pulses, that equals a full or half a cycle; and determining pulses due to n dimmers by detecting a time interval between a pulse and n pulses later that equals a full or half a cycle.

4. A method according to claim 1, wherein pulses due to a valid switching are identified by determining a following change in the current amplitude in the electrical line, which exceeds a predetermined value I-MIN.

5. A method according to claim 4, wherein the determination of a following change in the current, is based on the following perceptions:

after the passage of a spark, as well as when a short arc is over, there is a considerable probability that the current will return to its previous value.

the period before said return takes place, is random and shorter than one second;

the statistical expectation of the pause between two normal switching operations is greater than one second; and after a switch is turned ON or OFF the current always changes, whereas after a faulty event the current sometimes changes and sometimes remains unchanged.

6. A method according to claim 1, wherein a sequence of pulses is defined as a noisy state if any two consecutive pulses constituting the state are separated by less than a duration T-QUIET.

7. A method according to claim 6 wherein T-QUIET is in the range of between 0.1 second and 1.0 second.

8. A method according to claim 1, further comprising the step of actuating an alarm and/or interrupting the current upon detecting of a sequence of pulses, exceeding a predetermined period of T-LONG-ARC.

9. A method according to claim 8, wherein T-LONG-ARC is in the range of 3 seconds to 50 seconds.

10. A method according to claim 1 wherein T-ARC is in the range of between 0.7 second and 3 seconds.

11. A method according to claim 1 wherein the summing step comprises:

actuating an alarm and/or a current breaker if the accumulated number of the arcing events exceeds a predetermined value N-ALARM, within a predetermined period; and activating a warning sign if the accumulated number of faulty events exceeds a predetermined value N-WARNING, within a predetermined period.

12. A method according to claim 11, wherein N-ALARM and N-WARNING are separately defined according to the required detection sensitivity and electric environment.

13. Apparatus for the early detection of faults in an electric supply system, comprising:

means for sensing RF transients on the electrical line;

means for transforming the RF transients into solitary pulses;

means for sensing the load current or changes in it, and providing a signal indicative of the current magnitude;

means for calculating accurate values of the average current, before and after a transient;

means for analyzing the temporal spacing between the solitary pulses, and:

(i) determining and discarding said solitary pulses that are found to originate from dimmers; and means for further analyzing the sequence of the remaining pulses to determine long-noisy states and accumulate their time duration in a specific register;

means for counting the remaining short-noisy states and means for accumulating said count in a register; and means for alerting as soon as the accumulated count surpasses a predefined number N-WARNING, and means for alerting and/or activating a current breaker when the accumulated duration of the long-noisy states surpasses a predefined duration of N-ALARM seconds.

14. Apparatus according to claim 13, for use by an electrician, further comprising:

a display for displaying indications of the device; and a keyboard for entering predetermined values and parameters into the device, for setting its operation.

* * * * *